(12) United States Patent
Seo et al.

(10) Patent No.: US 9,473,307 B2
(45) Date of Patent: Oct. 18, 2016

(54) METHOD AND APPARATUS OF DATA AUTHENTICATION

(71) Applicant: Samsung Electronics Co., Ltd., Suwon-si (KR)

(72) Inventors: Seog Chung Seo, Seoul (KR); Eun Ah Kim, Seoul (KR); Tae Hong Kim, Yongin-si (KR); Myeong Wuk Jang, Hwaseong-si (KR); Sang Won Hyun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/299,805

(22) Filed: Jun. 9, 2014

(65) Prior Publication Data

US 2015/0006899 A1  Jan. 1, 2015

(30) Foreign Application Priority Data

Jul. 1, 2013 (KR) .......... 10-2013-0076637
Dec. 20, 2013 (KR) .......... 10-2013-0159806

(51) Int. Cl.
*H04L 9/32* (2006.01)

(52) U.S. Cl.
CPC .......... *H04L 9/3247* (2013.01); *H04L 9/3236* (2013.01); *H04L 9/3252* (2013.01)

(58) Field of Classification Search
None
See application file for complete search history.

(56) References Cited

U.S. PATENT DOCUMENTS

| | | | |
|---|---|---|---|
| 7,130,467 B1 | 10/2006 | Bronder et al. | |
| 7,627,763 B2* | 12/2009 | Fujimoto | G06F 21/64 713/177 |
| 7,639,818 B2 | 12/2009 | Fujimoto et al. | |
| 2005/0091261 A1 | 4/2005 | Wu et al. | |
| 2005/0188207 A1 | 8/2005 | Fujimoto et al. | |
| 2005/0281404 A1* | 12/2005 | Yu | 380/28 |
| 2009/0249220 A1 | 10/2009 | Golle et al. | |
| 2010/0153712 A1 | 6/2010 | Gentry | |
| 2011/0060909 A1 | 3/2011 | Brown et al. | |
| 2011/0225429 A1* | 9/2011 | Papamanthou et al. | 713/189 |
| 2012/0030468 A1 | 2/2012 | Papamanthou et al. | |
| 2013/0083926 A1* | 4/2013 | Hughes et al. | 380/278 |
| 2014/0032915 A1* | 1/2014 | Muzammil et al. | 713/176 |
| 2014/0090023 A1* | 3/2014 | Hu et al. | 726/4 |

FOREIGN PATENT DOCUMENTS

JP        2002-139995 A        5/2002

OTHER PUBLICATIONS

Merkle, Ralph. A Certified Digital Signature. BNR Inc., [online], Dec. 14, 1979 [retrieved on Jun. 18, 2015]. Retrieved from the Internet< URL: http://www.merkle.com/papers/Certified1979.pdf >.*

Yang, Fuw-Yi. Improvement on a Trapdoor Hash Function. Department of Computer Science and Information Engineering, Chaoyang University of Technology [online], Jan. 30, 2008 [retrieved on Jun. 18, 2015]. Retrieved from the Internet< URL: http://citeseerx.ist.psu.edu/viewdoc/download?doi=10.1.1.186.2676&rep=rep1&type=pdf >.*

International Search Report and Written Opinion of the International Searching Authority issued Oct. 24, 2014 in counterpart Application No. PCT/KR2014/005680 (9 pages).

Tartary, Christophe, et al. "An hybrid approach for efficient multicast stream authentication over unsecured channels." 2007 (14 pages).

\* cited by examiner

*Primary Examiner* — Hadi Armouche
*Assistant Examiner* — Malcolm Cribbs
(74) *Attorney, Agent, or Firm* — NSIP Law

(57) ABSTRACT

Provided are apparatuses and methods of generating and verifying signature information for data authentication. A method of verifying signature information may involves receiving signature information with respect to a predetermined number of data segments from a transmitter, constructing a hash tree based on the signature information, and verifying a validity of the signature information, by verifying trapdoor hash values using a root hash value of the constructed hash tree.

21 Claims, 11 Drawing Sheets

Transmitter $S_0$, $H_1$, $H_{23}$, $H_{4567}$, Signature($H_{01234567}$)
// Transmit packet with respect to segment $S_0$ $S_1$, $H_0$, $H_{23}$, $H_{4567}$, Signature($H_{01234567}$)
// Transmit packet with respect to segment $S_1$ Receiver 1. $H(S_0)=H_0$
2. $H(H_0'||H_1)=H_{01}'$
3. $H(H_{01}'||H_{23})=H_{0123}'$
4. $H(H_{0123}'||H_{4567})=H_{01234567}'$
   // Calculate root hash value
5. $H_{01234567}'$ ?= Verify( signature($H_{01234567}$))
   // Compare calculated root hash value to root hash value obtained through signature verification
   → When packet is determined valid, all of $H_1$, $H_{23}$, and $H_{4567}$ are authenticated.
   (to be stored in AHT)

1. Search AHT for $H_1$ corresponding to segment $S_1$
2. If present, $H(S_1)$ ?= $H_1$ in AHT
   → If identical, segment $S_1$ is determined valid.
   (Implicit authentication)
3. If absent, perform general verification.

FIG. 2

Transmitter $S_0$, $H_1$, $H_{23}$, $H_{4567}$, Signature($H_{01234567}$)
// Transmit packet with respect to
segment $S_0$ Receiver 1. $H(S_0)=H_0'$
2. $H(H_0'\|H_1)=H_{01}'$
3. $H(H_{01}'\|H_{23})=H_{0123}'$
4. $H(H_{0123}'\|H_{4567})=H_{01234567}'$
   // Calculate root hash value
5. $H_{01234567}'$ ?= Verify( signature($H_{01234567}$))
   // Compare calculated root hash value to
   root hash value obtained through signature
   verification
   → When packet is determined valid, all of
   $H_1$, $H_{23}$, and $H_{4567}$ are authenticated.
   (to be stored in AHT)

$S_1$, $H_0$, $H_{23}$, $H_{4567}$, Signature($H_{01234567}$)
// Transmit packet with respect to
segment $S_1$ 1. Search AHT for $H_1$ corresponding to
   segment $S_1$
2. If present, $H(S_1)$ ?= $H_1$ in AHT
   → If identical, segment $S_1$ is determined
   valid.
   (Implicit authentication)
3. If absent, perform general verification.

FIG. 8
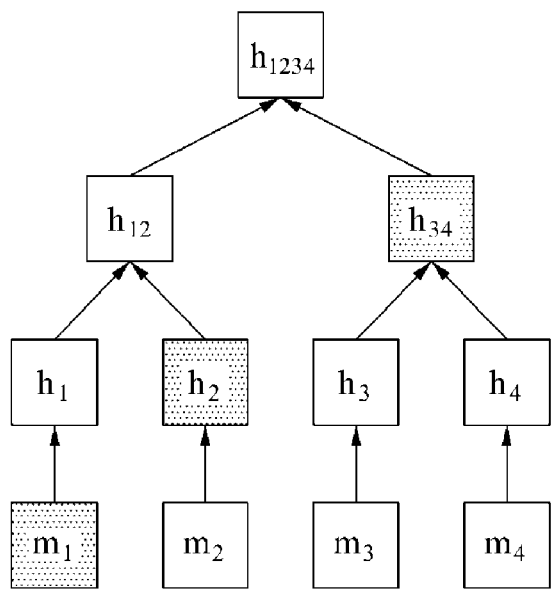
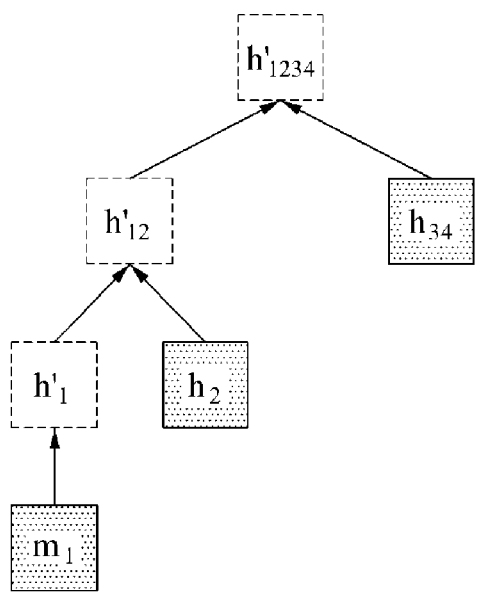

METHOD AND APPARATUS OF DATA AUTHENTICATION

CROSS-REFERENCE TO RELATED APPLICATION(S)

This application claims the benefit under 35 USC 119(a) of Korean Patent Application No. 10-2013-0076637 filed on Jul. 1, 2013, and Korean Patent Application No. 10-2013-0159806 filed on Dec. 20, 2013, in the Korean Intellectual Property Office, the entire disclosure of which is incorporated herein by reference for all purposes.

BACKGROUND

1. Field

The following description relates to a method and an apparatus of generating and verifying signature information for data authentication.

2. Description of Related Art

To ensure safe distribution of contents within a content centric network (CCN) environment, a content delivery network (CDN) environment, and/or a peer-to-peer (P2P) network environment, it is desirable to verify the authentication and integrity of contents that are being distributed. An electronic signature may be used to verify the authentication and integrity of contents. The electronic signature may be generated using a private key of a signatory, and may be verified using a public key of the signatory. However, because the generation and verification of electronic signature rely on mathematical algorithms, a significant computational load may be imposed on the transmitters and receivers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of generating signature information involves: constructing a hash tree with respect to a predetermined number of data segments; associating a root hash value of the hash tree with trapdoor hash values with respect to the data segments; and associating hash values of the hash tree and the trapdoor hash values with the data segments and transmitting the hash values of the hash tree and the trapdoor hash values to a receiver.

The hash tree may be a Merkle hash tree (MHT).

The hash values of the hash tree may be included in witness information, and the receiver may use the transmitted hash values of the hash tree in reconstructing the hash tree.

The hash values of the hash tree may include at least one hash value of the hash tree not associated directly with the data segments, in the constructed hash tree.

The number of the data segments, k, may have a value corresponding to a power of 2, and a number of hash values included in the hash tree may correspond to $\log_2 k$.

The general aspect of the method may further involve buffering the data segments.

In another general aspect, a method of verifying signature information involves: receiving signature information with respect to a predetermined number of data segments from a transmitter; constructing a hash tree based on the signature information; and verifying a validity of the signature information, by verifying trapdoor hash values using a root hash value of the constructed hash tree.

The constructing of the hash tree may involve constructing a Merkle hash tree (MHT) using witness information included in the signature information.

The general aspect of the method may further involve storing at least one of the root hash value of the hash tree and a hash value of the hash tree included in the signature information in an authenticated hash table (AHT).

The verifying of the signature information may involve obtaining at least one of the hash value of the hash tree and the root hash value of the hash tree from signature information of subsequently received data segments; searching the AHT to verify whether at least one of the obtained hash value of the hash tree and the obtained root hash value of the hash tree is stored in the AHT; and in response to at least one of the obtained hash value of the hash tree and the obtained root hash value of the hash tree being stored in the AHT, determining that the signature information of the subsequently received data segments is valid.

The general aspect of the method may further involve: in response to neither the obtained hash value of the hash tree nor the obtained root hash value of the hash tree being stored in the AHT, storing, in the AHT, at least one of the hash value of the hash tree and the root hash value of the hash tree.

The witness information may include the hash value of the MHT.

In another general aspect, a non-transitory computer-readable medium may include a program for instructing a computer to perform a method described above.

In another general aspect, a data segment transmitter includes: a hash tree constructor configured to construct a hash tree with respect to a predetermined number of data segments, a trapdoor operation unit configured to associate a root hash value of the hash tree with trapdoor hash values with respect to the data segments, and a signature information generator configured to associate hash values of the hash tree and the trapdoor hash values with the data segments and to transmit the hash values of the hash tree and the trapdoor hash values to a receiver.

The hash tree may be a Merkle hash tree (MHT).

The hash values of the hash tree may be used for reconstructing the hash tree by the receiver, and the hash values may be included in witness information.

The hash values of the hash tree may include at least one hash value of the hash tree not associated directly with the data segments, in the constructed hash tree.

In another general aspect, a data segment receiver may include: a data receiving unit configured to receive signature information with respect to a predetermined number of data segments; a tree constructor configured to construct a hash tree based on the signature information; and a signature information verifier configured to verify a validity of the signature information, by verifying trapdoor hash values using a root hash value of the constructed hash tree.

The tree constructor may be configured to construct a Merkle hash tree (MHT) using witness information included in the signature information.

The signature information verifier may include an authenticated hash table (AHT) configured to record at least one of the root hash value of the hash tree and hash values of the hash tree included in the signature information.

The signature information verifier may be configured to obtain at least one of the hash values of the hash tree and the root hash value of the hash tree from signature information of subsequently received data segments, search the AHT to verify whether at least one of the obtained hash values of the hash tree and the obtained root hash value of the hash tree is stored in the AHT, and, in response to at least one of the obtained hash values of the hash tree and the obtained root hash value of the hash tree being stored in the AHT, determine that the signature information of the subsequently received data segments is valid.

The witness information may include a hash value of the MHT.

In another general aspect, an apparatus for data authentication includes: a data receiving unit configured to receive signature information with respect to a predetermined number of data segments, the signature information comprising information for constructing a hash tree associated with the data segments; a signature information verifier comprising an authenticated hash table (AHT) stored in a memory, in which the signature information verifier is configured to obtain a hash value or a root hash value associated with the signature information, and to search the AHT to verify whether either the obtained hash value or the obtained root hash value is stored in the AHT.

The signature information verifier may be configured to, in response to either the obtained hash value or the obtained root hash value being stored in the AHT, determine that the signature information of the data segments is valid, and, in response to neither the obtained hash value nor the obtained root hash value being stored in the AHT, store the obtained hash value or the obtained root hash value in the AHT.

The general aspect of the apparatus may be a user terminal or a networking device.

Other features and aspects will be apparent from the following detailed description, the drawings, and the claims.

BRIEF DESCRIPTION OF THE DRAWINGS

FIG. 2 is a diagram illustrating an example of a method of verifying a validity of signature information generated based on an MHT according to the present disclosure.

FIG. 8 is a diagram illustrating an example of transmitting four data segments using a method of generating and verifying signature information.

Figure 1:
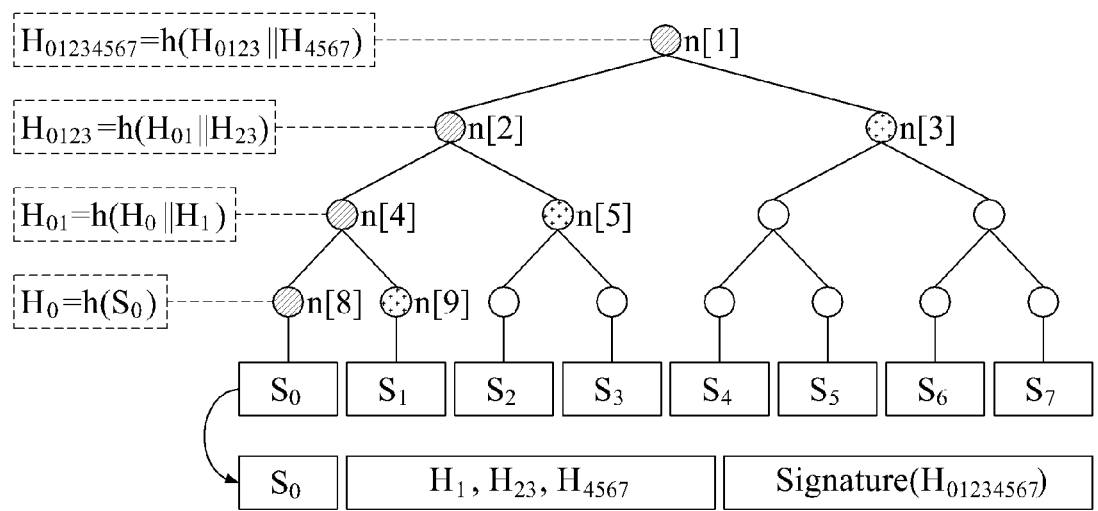
FIG. 1 is a diagram illustrating an example of a method of generating signature information based on a Merkle hash tree (MHT) according to a conventional art.

Throughout the drawings and the detailed description, unless otherwise described, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, the term "transmitter" and the term "receiver" may also be referred to as "transmitting node" and "receiving node", respectively. The transmitter and the receiver may include, for example, customer devices such as a user terminal, and networking devices such as an access point and a router. A user terminal includes, for example, a smart phone, a smart television (TV), a personal computer (PC), a laptop computer and the like.

Hereinafter, the term "data segment" or "packet" may refer to a formatted block of data transmitted between a data transmitter and a data receiver. The "data segment" may be construed as the same as "data block" or "data segments" including a plurality of items of streaming data, or construed to include "data segments".

Hereinafter, before describing an example of a method of generating signature information with respect to a data segment, a method of generating signature information based on a Merkle hash tree (MHT), and a method of verifying a validity of signature information generated based on an MHT will be described.

FIG. 1 illustrates an example of a method of generating signature information based on a MHT.

An MHT technique is an example of signature amortization methods that may be used to reduce a computational load caused by the generation and verification of signature information for data authentication. The illustrated example of MHT technique involves distributing a computational load caused due to the generation of signature information by generating signature information with respect to a predetermined number of data segments, rather than by generating signature information for each data segment for all data segments.

Referring to FIG. 1, an example of calculating a binary hash tree with respect to N data segments, and calculating signature information with respect to a root of the tree is illustrated. In this example, N is a predetermined number having a value equal to a power of 2. In FIG. 1, h denotes a hash operation, H denotes a hash value, and S denotes signature information. In addition, I denotes a concatenation operator.

A data segment transmitted to a receiver may include signature information with respect to a root hash value, and hash values of sibling nodes or a sub-tree to be used for calculating the root hash value in a tree.

For example, referring to FIG. 1, a packet with respect to data segment $S_0$ includes the data segment $S_0$ and includes $H_1$ denoting a hash value of $S_1$, $H_{23}$ denoting a hash value of $H_2$ and $H_3$, $H_{4567}$ denoting a hash value of $H_{45}$ and $H_{67}$, and Signature ($H_{01234567}$) denoting signature information with respect to a root hash value.

In this MHT technique, because each packet that is transmitted to a receiver includes all information to be used for authenticating the packet itself, the packet is not negatively affected by a packet loss or a change in packet transfer order during the transfer.

A sequence of performing a verification using this MHT technique may be as follows.

The receiver may extract a root hash value by performing a signature verification operation with respect to signature information on a data payload. The receiver may directly calculate a root hash value of an MHT, based on hash values, for example, $H_1$, $H_{23}$, and $H_{4567}$, and a received data segment, for example, the data segment $S_0$. When the directly calculated root hash value is identical to the root hash value extracted through verification of the signature information, the receiver may determine that the corresponding packet is valid.

FIG. 2 illustrates an example of a method of verifying a validity of signature information generated based on an MHT.

In FIG. 2, an implicit authentication scheme uses an MHT technique in verification.

In response to a determination through a verification process that a packet including a data segment $S_0$ is valid, it may also be determined that hash values used for the verification, for example, $H_1$, $H_{23}$, and $H_{4567}$, are valid. In response, the authenticated hash values may be stored in an authenticated hash table (AHT).

Subsequently, in response to receiving a packet including a data segment $S_1$, a receiver may search the AHT for a hash value $H_1$ corresponding to the data segment $S_1$.

In the event that the hash value $H_1$ corresponding to the data segment $S_1$ is present in the AHT, the receiver may skip the verification process and verify whether $h(S_1)$ is identical to $H_1$ to verify whether the data segment $S_1$ is valid.

The method of generating and verifying signature information based on the MHT may reduce a number of times that the generation and verification of the signature information is performed, in comparison to a method in which a signature information operation is performed for each packet such as, for example, a per packet signature method. However, with this method, an operation load for generating the signature information remains the same. Accordingly, an operation load at a transmitter may be relatively large.

In addition, because the MHT technique may be performed based on a binary tree, the MHT technique may be less flexible in selecting a number of data segments constituting a block. For example, the number of data segments constituting the block may be increased to 2, 4, 8, 16, 32, 64, ..., $2^k$. Accordingly, a tradeoff between a verification performance and a number of data segments to be buffered exists. In addition, in the event that the number of the data segments does not correspond to a power of 2, an efficiency in terms of a transmission rate and a computational load may be decreased because the MHT technique is based on a binary tree.

Figure 3:
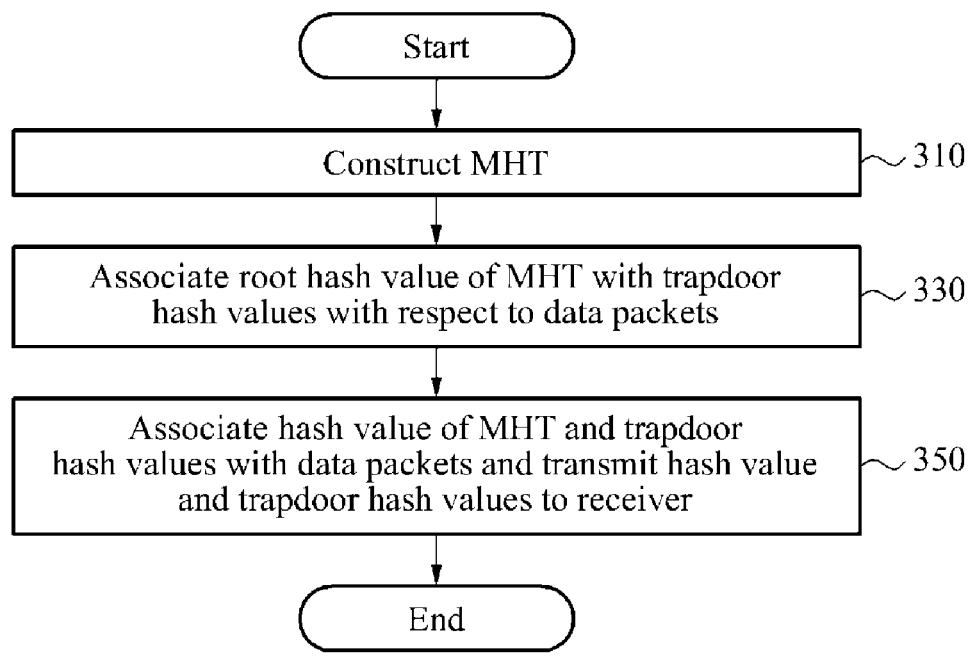
FIG. 3 is a flowchart illustrating an example of a method of generating signature information with respect to a data segment by a data segment transmitter.

FIG. 3 is a flowchart that illustrates an example of a method of generating signature information with respect to a data segment by a data segment transmitter.

Referring to FIG. 3, in operation 310, the data segment transmitter, hereinafter referred to as the "transmitter", constructs an MHT with respect to a predetermined number of data segments. The predetermined number of data segments may be k, and the value of k may correspond to a power of 2. In addition, $\log_2 k$ hash values of the MHT may be included. The data segments may be buffered to the transmitter.

A data packet may have a format of a data block, and may include a plurality of data segments.

For example, in operation 310, the transmitter may be configured to construct an MHT with respect to k data blocks. The transmitter may buffer the data segments.

In operation 330, the transmitter associates a root hash value of the MHT constructed in operation 310 with trapdoor hash values with respect to the data segments. For instance, the expression "associating a root hash value of the MHT with trapdoor hash values with respect to the data segments" may be construed to indicate that trapdoor hash values with respect to the data segments are calculated or processed based on a root hash value of the MHT. A method of associating the root hash value of the MHT with the trapdoor hash values with respect to the data segments by the transmitter will be described with reference to FIG. 8.

In operation 350, the transmitter associates a root hash value of the MHT and the trapdoor hash values with the data segments, and transmits hash values of the MHT and the trapdoor hash values to a receiver. The expression "associating a root hash value of the MHT and the trapdoor hash values with the data segments, and transmitting hash values of the MHT and the trapdoor hash values to a receiver" may be construed to indicate that trapdoor hash values and hash values of the MHT to be used for verifying a validity of a data segment are transmitted along with the corresponding data segment.

The hash values of the MHT, for example, witness information, may include information that is used by the receiver to reconstruct the MHT. The witness information may include at least one hash value of the MHT not directly associated with the data segments, in the MHT constructed in operation 310. The at least one hash value of the MHT not associated directly with the data segments may include at least one of hash values of an MHT of a sibling node and a sub-tree.

According to one example, by combining the concept of trapdoor hash function with MHT, a data authentication method that minimizes a computational load at the transmitter and receiver ends and is robust against packet losses and transmission errors may be provided.

For data authentication, the transmitter may construct an MHT with respect to data segments to be transmitted, and associate a root hash value of the MHT with a trapdoor hash function in order to generate the signature information for the data segments.

The transmitter may transmit to the receiver information to be used for reconstructing the root hash value of the MHT, and the receiver may selectively verify a validity of the signature information with respect to the data segments using the trapdoor hash function or an AHT.

Figure 4:
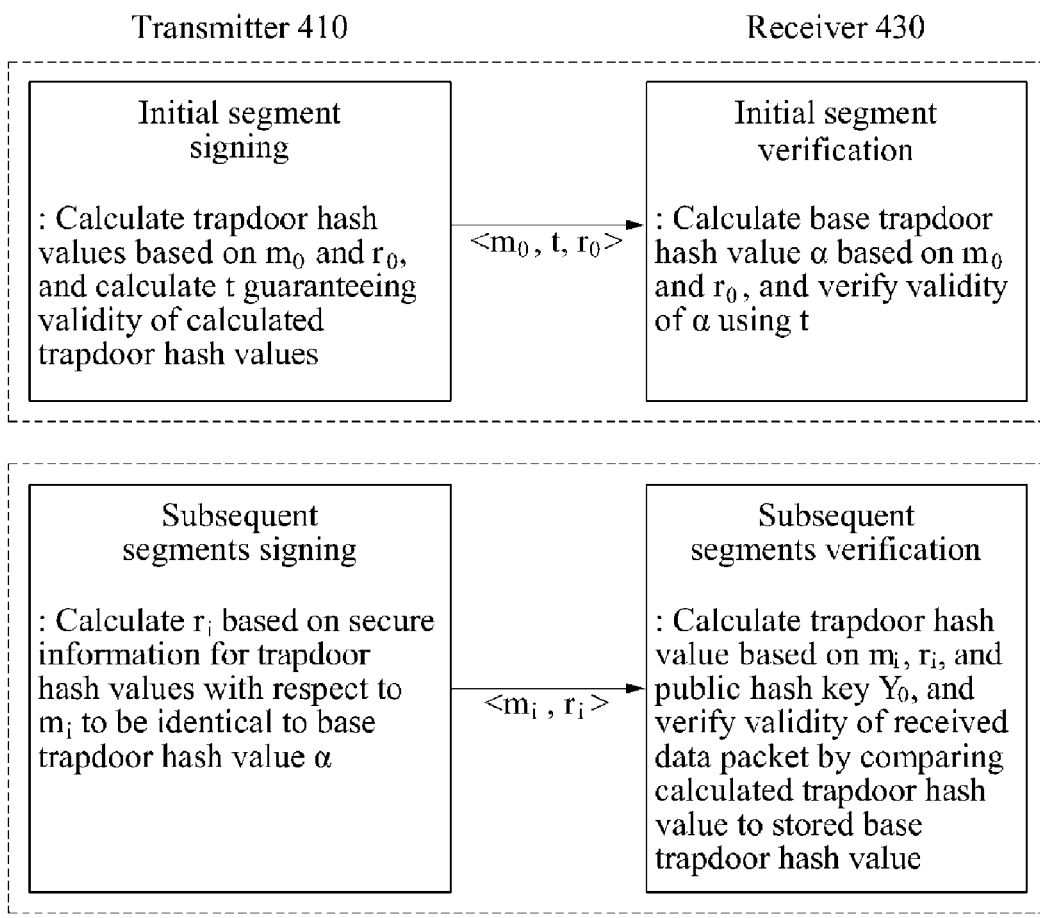
FIG. 4 is a diagram illustrating an example of a general method of performing authentication based on a trapdoor hash function.

FIG. 4 illustrates an example of a method of performing authentication based on a trapdoor hash function.

During a process of generating signature information for data authentication, a trapdoor hash function may be applied to reduce a computational load. According to a method of generating signature information, a single exponentiation, for example, $(M)^Y \mod N$, N: 1024-bit, Y: 160-bit, may be performed. In a method of generating signature information based on the trapdoor hash function, however, a fewer number of multiplications may be performed.

According to one example, a method of generating and verifying signature information based on the trapdoor hash function may employ a digital signature algorithm (DSA).

Referring to FIG. 4, an authentication method based on the trapdoor hash function is illustrated.

A transmitter 410 calculates a trapdoor hash value with respect to a first data segment $m_0$, and transmits to a receiver 430 signature information t that may guarantee a validity of a base trapdoor hash value. The receiver 430 calculates the base trapdoor hash value α based on the data segment $m_0$ received from the transmitter 410, the trapdoor hash value with respect to the data segment $m_0$, and a public key value $r_0$.

By verifying the signature information t, the receiver 420 determines a validity of the calculated base trapdoor hash value α. The calculated base trapdoor hash value α may be used to verify a validity with respect to successively transferred data segment later.

The receiver 430 may verify the validity with respect to the successively transferred data segments by comparing the trapdoor hash value calculated from the packet received from the transmitter 410 to the base trapdoor hash value α.

The transmitter 410 calculates signature information $r_i$, for example, a hash collision-inducing value, based on information on a secure private trapdoor hash key $y_0$ for a trapdoor hash value with respect to a data segment $m_i$ to be identical to the base trapdoor hash value α. When the transmitter 410 transfers the data segment $m_i$ and the hash collision-inducing value the receiver 430 calculates a trapdoor hash value with respect to the data segment $m_i$ and the hash collision-inducing value $r_i$, and compares the calculated trapdoor hash value to the base trapdoor hash value α to verify a validity of the data segment $m_i$.

The foregoing process may be arranged as follows.

The transmitter 410 calculates and transmits $\langle m_0, t, r_0\rangle$. In response to receiving $\langle m_0, t, r_0\rangle$, the receiver 430 may calculate and store a base trapdoor hash value that may be used as a reference for determining a validity of a packet or a data segment to be transferred later, based on the received $\langle m_0, t, r_0\rangle$.

The transmitter 410 may calculate and transfer the signature information $r_i$, for example, the hash collision-inducing value, for a trapdoor hash value of a corresponding data segment $m_i$ to be identical to the base trapdoor hash value, based on information on a secure private trapdoor hash key $y_0$ with respect to data segments to be transferred later.

The receiver 430 may calculate a trapdoor hash value, based on $\langle m_i, r_i\rangle$ transferred from the transmitter 410 and a public hash key $Y_0$, and compare the calculated trapdoor hash value to a stored base trapdoor hash value to evaluate a validity of a data segment received from the transmitter 410.

The process described above may be expressed using a digital signature algorithm (DSA)-based electronic signature algorithm, as illustrated in Table 1 and Table 2.

TABLE 1

Initial segment generation

1. Choose an ephemeral private key $k_0 \in_R Z_q^*$ and compute the corresponding ephemeral public key $r_0 = g^{k_0} \in Z_p^*$.
2. Compute the trapdoor hash of $m_0$ as $TH_{Y_0}(m_0, r_0) = g^{h_{m_0}} Y_0^{r_0} \mod q$, where $h_{m_0} = H(m_0 \| Y_0)$, using its long term hash key $Y_0$.
3. Solve for t in the equation:
$t \equiv k_0 + xG(TH_{Y_0}(m_0, r_0)\|m_0\|r_0) \mod q$
(this is the well-known DL-Schnorr [34] signature scheme).
4. Signature on $m_0$ is given by $\sigma = \langle t, r_0\rangle$.

Initial segment verification

1. Look up the long-term hash key $Y_0$ of sender from a publicly available directory and store $Y_0$.
Compute $h_{m_0} = H(m_0\|Y_0)$.
2. Compute $TH_{Y_0}(m_0, r_0) = g^{h_{m_0}} Y_0^{r_0} \mod q$ and $h = G(TH_{Y_0}(m_0, r_0)\|m_0\|r_0)$.
3. Compute $r' = g^t X^{-h} \mod q$. If $r' \neq r_0 \mod q$, output Invalid and abort.
4. Otherwise, output Valid and store $TH_{Y_0}(m_0, r_0)$ in cache.

Table 1 includes an example of an algorithm for a method of generating and verifying signature information with respect to a first data segment in trapdoor hash function-based authentication.

Parameters $\langle p, q, g, H, G\rangle$ to be used in a DSA domain may be shared between a transmitter and a receiver. In this example, p denotes a 1024-bit prime, q denotes a 160-bit prime, q|p−1, g denotes an element of $Z_p^*$ of which an order corresponds to q, and H and G denote hash functions. In addition, $Z_p^*$ denotes a type of an integer set, ranging from 1 to p−1.

In $\langle x, X\rangle$, x denotes a long-term private key of the transmitter, and may correspond to, for example, an element of $Z_p^*$. X denotes a long-term public key, and may correspond to, for example, $g^x$ belonging to $Z_p^*$. The private key may be known only to the transmitter, and the public key may be shared by the receiver.

In $\langle y_0, Y_0\rangle$, $y_0$ denotes a long-term private trapdoor hash key of the transmitter, and $Y_0$ denotes a public hash key. The trapdoor hash key may be known to the transmitter, and the public hash key may be made public to the receiver.

TABLE 2

Subsequent segment generation

1. Choose an ephemeral trapdoor key $y_i \in_R Z_q^*$ and compute the corresponding ephemeral hash key $Y_i = g^{h_i} \in Z_p^*$. Store the pair $(y_i, Y_i)$.
2. Compute $h_{m_i} = H(m_i\|Y_i)$ and using trapdoor key $y_0$ and ephemeral key $y_i$, solve for $r_i$ in the equation:
$r_i = y_i^{-1}(h_{m_0} - h_{m_i} + y_0 r_0) \mod q$.

Subsequent segment verification

1. Retrieve $TH_{Y_0}(m_0, r_0)$ from cache and compute $h_{m_i} = H(m_i\|Y_i)$.
2. Compute $TH_{Y_i}(m_i, r_i) = g^{h_{m_i}} Y_i^{r_i} \mod q$.
3. Check whether $TH_{Y_0}(m_0, r_0) = TH_{Y_i}(m_i, r_i)$. If check fails, output Invalid
4. Otherwise, output Valid.

Table 2 includes an example of an algorithm for a method of generating and verifying signature information with respect to data segments subsequent to the first data segment in trapdoor hash function-based authentication.

Table 1 and Table 2 correspond to the process illustrated in FIG. 4 in which an actual DSA-based electronic signature algorithm is applied.

In Table 1, a DL-Schnorr signature scheme is employed to transfer a base trapdoor hash value safely.

In this example, $TH_{y_0}(m_0, r_0)$ calculated in operation 2 of the signature information verification on a left side of Table 1 may correspond to the base trapdoor hash value, and a validity of the base trapdoor hash value may be verified through operation 3 on a right side.

In operation 2 of the signature information generation on the left side of Table 2, a hash collision-inducing value $r_i$ enabling a trapdoor hash value with respect to a data segment $m_i$ to be identical to the base trapdoor hash value may be calculated based on a secure private trapdoor hash key $y_0$, and public information $r_0$. Accordingly, signature information may be compared rapidly through performing several multiplications.

In operation 2 of the signature information verification of on a right side Table 2, a trapdoor hash value with respect to a data segment $m_i$ may be calculated based on $m_i$ and $r_i$. In this instance, an exponentiation may be used.

In operation 3, by comparing the trapdoor hash value calculated in operation 2 to the base trapdoor hash value, a validity of the data segment $m_i$ may be verified.

Figure 5:
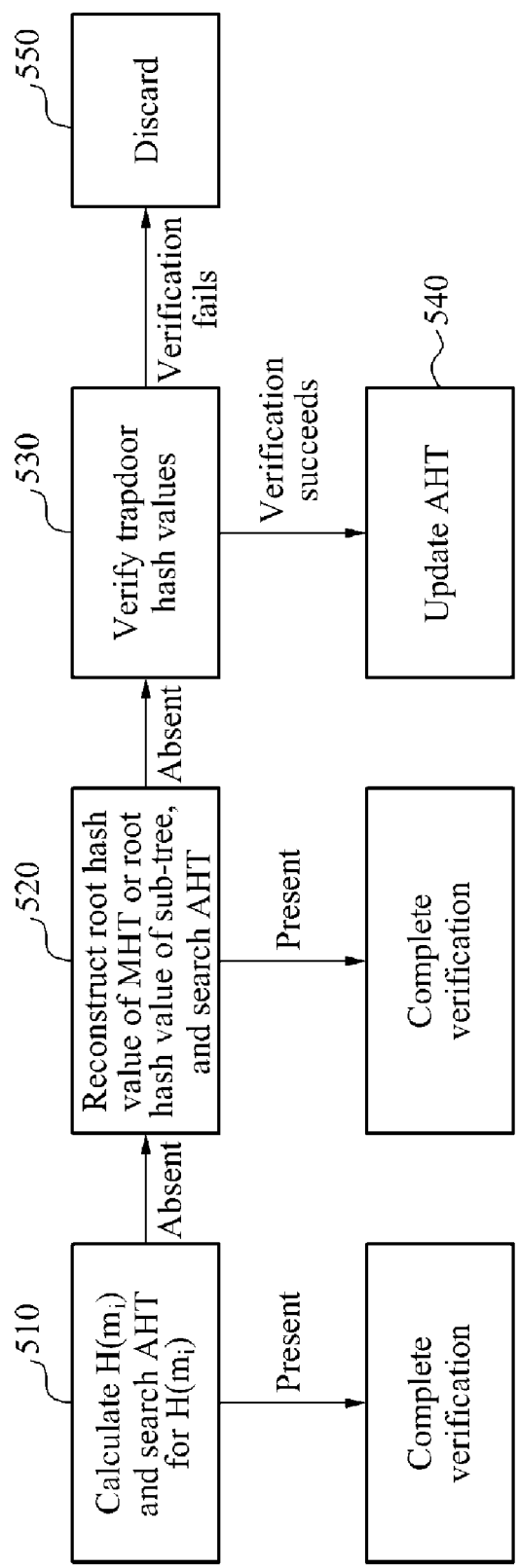
FIG. 5 is a diagram illustrating an example of a process of verifying signature information with respect to a data segment by a receiver.

FIG. 5 illustrates an example of a method of verifying signature information with respect to a data segment that may be performed by a receiver.

Referring to FIG. 5, a sequence in which the receiver may verify signature information with respect to a data segment received from a transmitter is illustrated.

In operation 510, in response to receiving the data segment from the transmitter, the receiver calculates a hash value $H(m_i)$ with respect to the data segment, for example, a data segment and searches an AHT to verify whether the hash value $H(m_i)$ is stored in the AHT.

In the event that it is verified in operation 510 that the hash value $H(m_i)$ is stored in the AHT, the receiver may complete the verification process with respect to the data segment $m_i$. In this example, an amount of computation may be expressed by 1 H, and H may denote a computational cost used to perform a single hash function or algorithm.

Conversely, in the event that it is verified in operation 510 that the hash value $H(m_i)$ is not stored in the AHT, the receiver reconstructs a root hash value of an MHT or a root hash value of a sub-tree, and searches the AHT to verify whether corresponding hash values, for example, the root hash value or the root hash value of the sub-tree, are stored in the AHT, in operation 520.

In the event that it is verified in operation 520 that the root hash value or the root hash value of the sub-tree is stored in the AHT, the receiver may complete the verification process with respect to the data segment $m_i$. In this instance, the computational cost may be expressed by $(\log_2(k)+1)$ H. In this example, k denotes a number of data packets or data segments included in the identical MHT.

Conversely, in the event that it is verified in operation 520 that the corresponding hash values, for example, the root hash value or the root hash value of the sub-tree, is not stored in the AHT, the receiver performs verification with respect to a trapdoor hash value, in operation 530. In this instance, the computational cost may be expressed by $2.06X+(\log_2(k)+2)H$. In this example, X denotes an amount of computation of a Schnorr exponentiation having a 1024-bit base and a 160-bit exponent.

In the event that the verification with respect to the trapdoor hash value is performed successfully in operation 530, the receiver updates the AHT with respect to relevant hash values calculated during the verification, in operation 540.

Conversely, in the event that verification with respect to the trapdoor hash value fails in operation 530, the receiver discards relevant hash values, in operation 550.

The receiver may perform trapdoor verification with respect to a single data segment, and may perform verification with respect to remaining k–1 data segments by searching for a hash value stored in the AHT and performing comparison.

According to an example, with respect to data segments included in an identical MHT, by comparing a hash value included in the AHT to hash values of the MHT, rather than verifying a trapdoor hash value, an amount of computation to be performed in order to verify the trapdoor hash value may be reduced.

Hereinafter, a method of verifying signature information by the receiver will be described in detail with reference to FIGS. 6 and 7.

Figure 6:
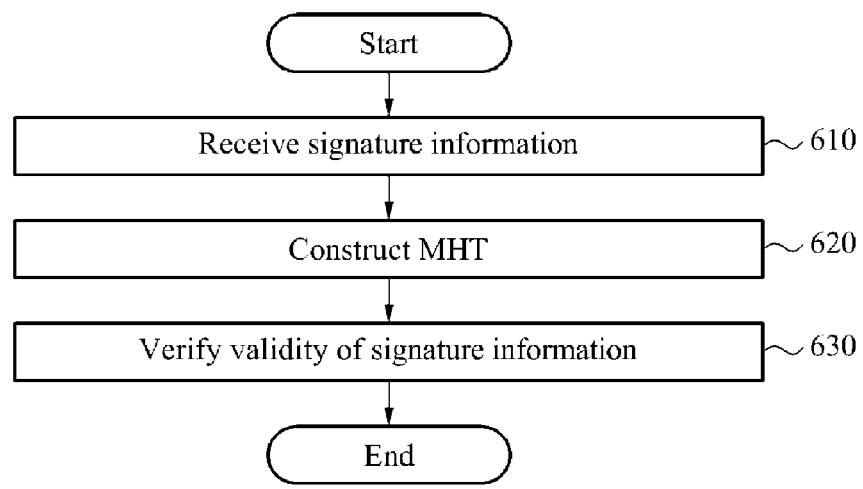
FIG. 6 is a flowchart illustrating an example of a method of verifying signature information with respect to a data segment by a receiver.

FIG. 6 illustrates an example of a method of verifying signature information with respect to a data segment that may be performed by a receiver.

Referring to FIG. 6, the receiver receives signature information with respect to a predetermined number of data segments transmitted from a transmitter, in operation 610.

In operation 620, the receiver constructs an MHT using witness information included in the signature information received in operation 610. The witness information may include trapdoor hash values and hash values of the MHT.

In order to verify a validity of the signature information, the receiver may construct an MHT using the witness information transmitted along with first data segment, and may determine a validity of the trapdoor hash values using a root hash value of the MHT.

The receiver may store, in an AHT, at least one of the root hash value of the MHT and the hash values of the MHT included in the signature information. According to an example, in response to verifying a validity of signature information with respect to a data segment, relevant hash values may be stored in the AHT to be used later for quick verification.

The receiver may verify the trapdoor hash values using the root hash value of the MHT constructed in operation 620. In operation 630, the receiver verifies a validity of the signature information by verifying the trapdoor hash values. A method of verifying a validity of the signature information by the receiver will be described in detail with reference to FIG. 7.

Figure 7:
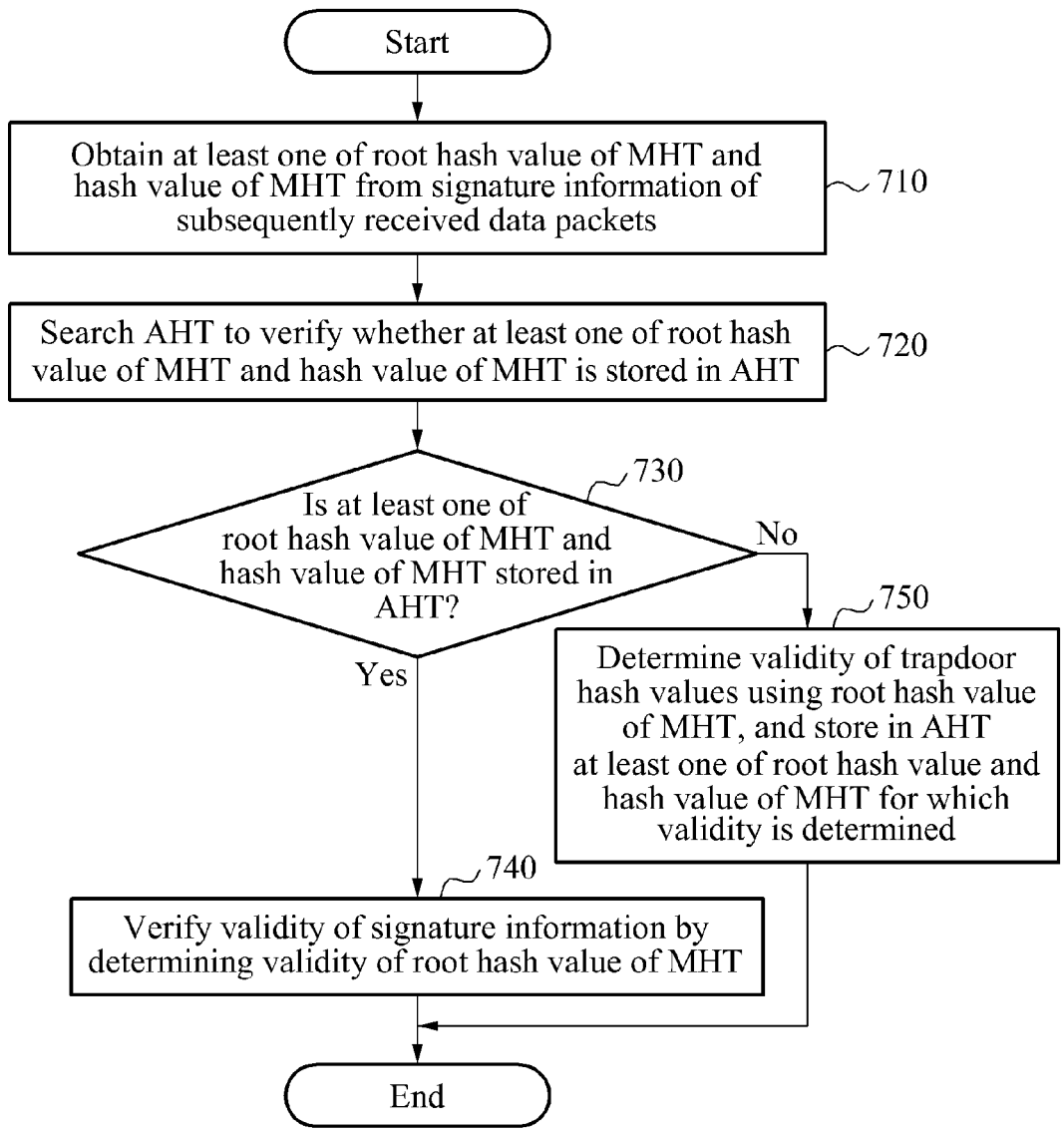
FIG. 7 is a flowchart illustrating an example of a method of verifying a validity of signature information in the method of FIG. 6.

FIG. 7 illustrates an example of a method of verifying a validity of signature information in the method described with reference to FIG. 6.

FIG. 7 illustrates an example of a method of configuring an AHT through the method of FIG. 6 and vilifying a validity of signature information using the configured AHT.

Referring to FIG. 7, a receiver obtains at least one of hash values of an MHT and a root hash value of the MHT from signature information with respect to data segments received subsequently to a first data segment, in operation 710.

In operation 720, the receiver searches an AHT to verify whether at least one of the hash value of the MHT and the root hash value of the MHT obtained in operation 710 is stored in the AHT. In this example, the hash value of the MHT may include at least one of hash values of a sibling node and a sub-tree of the MHT.

In operation 730, the receiver verifies whether at least one of the hash value of the MHT and the root hash value of the MHT obtained in operation 710 is stored in the AHT.

In response to verifying in operation 730 that at least one of the hash value of the MHT and the root hash value of the MHT is stored in the AHT, the receiver determines that the signature information of the subsequently received data segments is valid, in operation 740. Accordingly, a validity of the signature information is verified.

Conversely, in response to verifying in operation 730 that at least one of the hash values of the MHT and the root hash value of the MHT is not stored in the AHT, the receiver determines a validity of a trapdoor hash value by verifying the trapdoor hash value with respect to the data segment and the root hash value of the MHT. If it is verified that the trapdoor hash value is valid, the receiver stores relevant hash values in the AHT, in operation 750. For example, the receiver may store the hash values of the MHT or the root hash value of the MHT.

FIG. 8 illustrates an example of transmitting four data segments using a method of generating and verifying signature information.

Referring to FIG. 8, an example in which a concept of an MHT is applied to generation and verification of signature information with respect to four data segments using a trapdoor hash function is illustrated.

In generation of signature information by constructing an MHT with respect to the four data segments, a root hash value of the MHT may be used to calculate trapdoor hash values, and in verification of the signature information, a root hash value may be calculated by reconstructing the MHT using a hash path of the MHT included in witness information and a data segment received from a transmitter.

A receiver may verify a validity of the received data segment using the calculated root hash value of the MHT for verification of the signature information. In this example, in response to determination that the signature information is valid during the verification process, the data segment, hash values received along with the data segment, and the calculated root hash value may be determined to be valid. In response, the receiver may record the corresponding hash values in an AHT.

The receiver may verify a validity of a data segment included in the identical MHT, by verifying a validity of signature information through determining whether a hash value of the data segment is present in the AHT, rather than performing verification of the signature information with respect to trapdoor hash values.

For example, the transmitter may transmit four data segments $m_1$, $m_2$, $m_3$, and $m_4$ to the receiver. The transmitter may transmit signature information with respect to each corresponding data segment along with the corresponding data segment.

The transmitter may construct an MHT with respect to the four data segments $m_1$, $m_2$, $m_3$, and $m_4$, and calculate trapdoor hash values by performing a trapdoor hash operation with respect to the data segments $m_1$, $m_2$, $m_3$, and $m_4$ using a root hash value of the MHT. The root hash value of the MHT may be reflected in the trapdoor hash values.

In this example, a hash collision-inducing value $r_i$ enabling a trapdoor hash value with respect to a data segment $m_i$ to be identical to a base trapdoor hash value may be calculated by Equation 1.

$$r_1 = y_1^{-1}(h_{m_0} - h_{m_1,h_{1,2,3,4}} + y_0 r_0) \bmod q,\ r_2 = y_2^{-1}(h_{m_0} - h_{m_2,h_{1,2,3,4}} + y_0 r_0) \bmod q,\ r_3 = y_3^{-1}(h_{m_0} - h_{m_3,h_{1,2,3,4}} + y_0 r_0) \bmod q,\ r_4 = y_4^{-1}(h_{m_0} - h_{m_4,h_{1,2,3,4}} + y_0 r_0) \bmod q \text{ where } h_{m_i,h_{j,k,l,m}} = H(m_i \| h_{j,k,l,m} \| Y_0)$$
[Equation 1]

In Equation 1, $y_0$ denotes a long-term private trapdoor hash key, and $r_0$ denotes a public hash key value. $Y_0$ denotes a public hash key.

The long-term private trapdoor hash key of the transmitter is to be known by the transmitter, and the public hash key may be made public to the receiver.

In Equation 1, q denotes a 160-bit prime, and H denotes a hash function.

The transmitter may transmit, to the receiver, the data segment $m_i$, hash values $h_2$ and $h_{34}$ of the MHT, and the hash collision-inducing value $r_1$. The hash values $h_2$ and $h_{34}$ of the MHT may be used for reconstructing the MHT by the receiver receiving the corresponding information. The hash values $h_2$ and $h_{34}$ of the MHT may correspond to at least one of hash values of a sibling node or a sub-tree not associated directly with the segment $m_1$ in the MHT.

According to an example described above, signature information may be generated by associating multiple data segments, whereby implicit authentication may be applied for verification of the signature information.

The transmitter may transmit, to the receiver, the data segment $m_1$ and signature information ($h_2$, $h_{34}$, $r_1$) with respect to the data segment $m_1$.

The transmitter may transmit, to the receiver, each data segment and piece of signature information of the corresponding data segment in a form of ($m_2$, $h_1$, $h_{34}$, $r_2$), ($m_3$, $h_4$, $h_{12}$, $r_3$), and ($m_4$, $h_3$, $h_{12}$, $r_4$).

An operation of the receiver corresponding to the operation of the transmitter described above may be described as follows.

The receiver receiving the signature information ($m_1$, $h_2$, $h_{34}$, $r_1$) may calculate a root hash value of the MHT using witness information included in the signature information. The witness information may include hash values of the MHT. The receiver may calculate the root hash value of the MHT based on the received data segment and the hash values included in the witness information, and reconstruct the MHT using the calculated root hash value. In this instance, the MHT reconstructed by the receiver may be represented as illustrated in a lower portion of FIG. 8.

The receiver may verify whether the current trapdoor hash value is identical to a base trapdoor hash value. In this example, the receiver may perform verification with respect to values expressed by Equation 2.

$$TH_{Y_0}(m_0, r_0) \stackrel{?}{=} TH_{Y_1}(m_1, h'_{1234}, r_1)\ TH_{Y_1}(m_1, H_{1,2,3,4}, r_1) = g^{h_{m1,h1,2,3,4}} Y_1^{r_1} \bmod q = g^{h_{m1,h1,2,3,4}} g^{y_1 r_1} \bmod q = g^{h_{m1,h1,2,3,4}} g^{y_1 r_1^{-1}(h_{m_0} - h_{m_1,H_{1,2,3,4}} + y_0 r_0)} \bmod q = g^{h_{m1,h1,2,3,4}} g^{(h_{m0} - h_{m1,H_{1,2,3,4}} + y_0 r_0)} \bmod q = g^{(h_{m0} + y_0 r_0)} \bmod q = TH_{Y_0}(m_0, r_0)$$
[Equation 2]

In Equation 2, $TH_{Y_0}(m_0, r^0)$ denotes a base trapdoor hash value, $TH_{Y_1}(m_1, h'_{1234}, r_1)$ denotes trapdoor hash values of $m_1$ reconstructed by the receiver.

In Equation 2, g denotes an element of $Z_p^*$ of which an order corresponds to q, $r_1$ denotes a hash collision-inducing value, $h_{m_0}$ denotes $H(m_0 \| Y_0)$, and $h_{m_1, H_{1,2,3,4}}$ denotes $H(m_1 \| h_{1,2,3,4} \| Y_0)$.

In addition, $y_0$ denotes a long-term private trapdoor hash key, and $r_0$ denotes a public hash key value. $Y_0$ denotes a public hash key. Further, $y_1$ denotes an ephemeral trapdoor hash key generated by the transmitter, and $Y_1^{r_1}$ denotes a result of exponentiation with a base of an ephemeral hash key $Y_1$ corresponding to the ephemeral trapdoor hash key and an exponent of $r_1$, which may also expressed by $(Y_1)^{r_1} = (g^{y_1})^{r_1} = (g)^{y_1 r_1}$.

In response to the verification with respect to the hash values $h_2$, $h_{34}$, and $h_{1234}$ being completed through Equation 2, the receiver may store the hash values $h_2$, $h_{34}$, and $h_{1234}$ in the AHT.

The receiver receiving the signature information ($m_2$, $h_1$, $h_{34}$, $r_2$) from the transmitter may search for a value with respect to $H(m_2)$ from the AHT and compare the received signature information to a found value.

The receiver may receive the signature information $(m_3, h_4, h_{12}, r_3)$, and search for a value with respect to $H(m_3)$ from the AHT. When the value with respect to $H(m_3)$ is absent in the AHT, the receiver may calculate a root hash value, for example, using $H(H(m_3)\|h_4)$ or $H(H(h_{12}\|H(m_3)\|h_4))$ to verify a validity of the signature information. $h_4$ and $h_{12}$ of which the validity is verified may be stored in the AHT.

The receiver receiving the signature information $(m_4, h_3, h_{12}, r_4)$ may search for a value with respect to $H(m_4)$ from the AHT. When a corresponding value is present, a validity of the received signature information may be verified.

According to an example, when a number of segments to be transmitted corresponds to a power of "2", for example, $2, 4, 8, 16, \ldots, 2^k$, an amount of authentication information to be transmitted may be reduced from an $O(k) \times$ hash size to an $O(\log 2(k) \times$ hash size, by applying a concept of an MHT.

In order to apply implicit authentication to verification of signature information according to an embodiment, an association between data segments may be generated to transmit hash values. Accordingly, an amount of data to be transmitted additionally may increase as a number of data segments increases. Depending on an embodiment, an amount of information to be transmitted may be reduced by probabilistically selecting and transmitting a portion of hash values of related data segments, rather than transmitting all hash values of the related segments.

Figure 9:
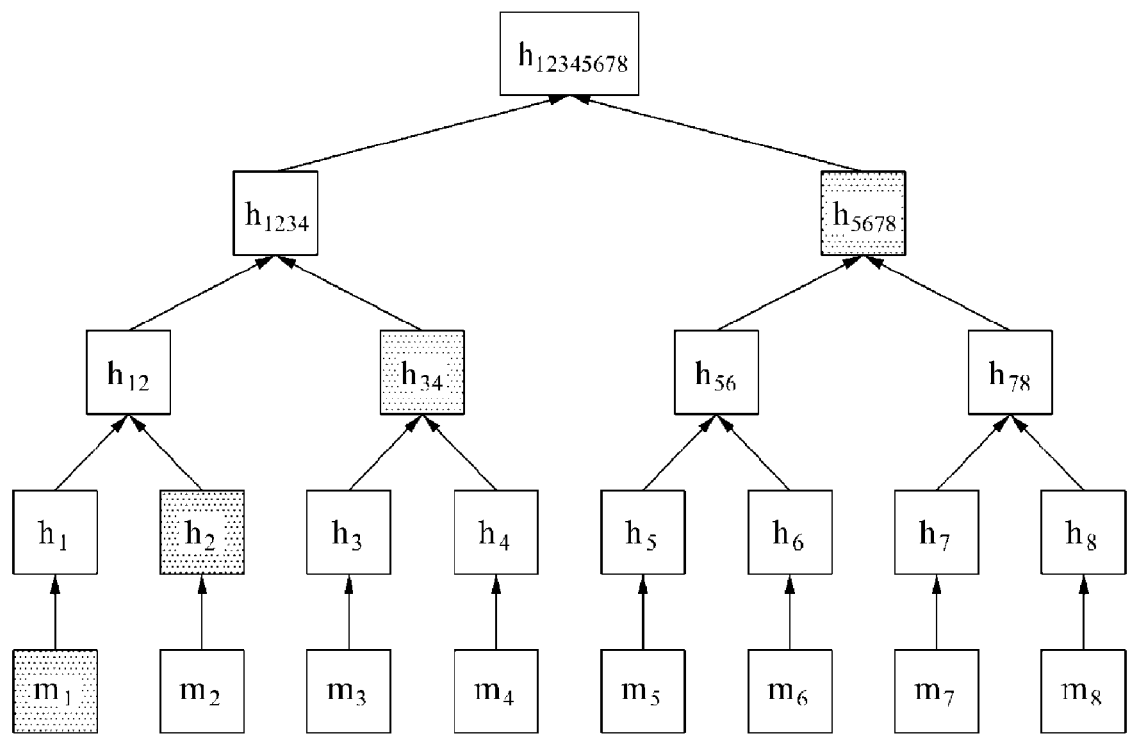
FIG. 9 is a diagram illustrating an example of transmitting eight data segments using a method of generating and verifying signature information.

FIG. 9 illustrates an example in which eight data segments are transmitted by using a method of generating and verifying signature information.

Referring to FIG. 9, an MHT may be applied to the generation and verification of signature information with respect to eight segments using a trapdoor hash function.

When a transmitter generates signature information with respect to eight data segments $m_1, m_2, m_3, m_4, m_5, m_6, m_7,$ and $m_8$, an MHT may be constructed, as illustrated in FIG. 9.

The transmitter may construct the MHT with respect to the eight data segments $m_1, m_2, m_3, m_4, m_5, m_6, m_7,$ and $m_8$, and may obtain trapdoor hash values by applying a root hash value of the MHT to a trapdoor hash operation with respect to the segments.

For example, the transmitter may transmit signature information with respect to the data segment $m_1$ to the receiver.

The transmitter may transmit, to the receiver, the data segment $m_1$ and hash values of the MHT, such as hash values $h_2, h_{34},$ and $h_{5678}$ of a sibling node or a sub-tree of the MHT and a hash collision-inducing value $r_1$. In this example, the hash values $h_2, h_{34},$ and $h_{5678}$ of the MHT may be used for reconstructing the MHT by the receiver.

According to the example described above, signature information may be generated by associating multiple data segments, whereby implicit authentication may be applied to verification of the signature information.

The transmitter may transmit, to the receiver, the data segment $m_1$ and signature information with respect to the data segment $m_1$ in a form of $(m_1, h_2, h_{34}, h_{5678}, r_1)$.

The transmitter may transmit, to the receiver, data segments and signature information with respect to each corresponding data segment in a form of $(m_2, h_1, h_{34}, h_{5678}, r_2)$, $(m_3, h_4, h_{12}, h_{5678}, r_3)$, $(m_4, h_3, h_{12}, h_{5678}, r_4)$, $(m_5, h_6, h_{78}, h_{1234}, r_5)$, $(m_6, h_5, h_{78}, h_{1234}, r_6)$, $(m_7, h_8, h_{56}, h_{1234}, r_7)$, and $(m_8, h_7, h_{56}, h_{1234}, r_4)$.

An operation of the receiver corresponding to the operation of the transmitter described above is described below.

The receiver receiving $(m_1, h_2, h_{34}, h_{5678}, r_1)$ including the data segment $m_1$ and the signature information with respect to the data segment $m_1$ may calculate a root hash value of the MHT based on witness information included in the signature information, as described with reference to FIG. 8. The receiver may calculate the root hash value of the MHT based on the trapdoor hash value, and reconstruct the MHT using the calculated root hash value.

The receiver may perform verification with respect to the trapdoor hash value using a scheme expressed by Equation 2.

When it is determined that the verification of the signature information with respect to the data segment $m_1$ is completed, the verification with respect to the hash values $h_2, h_{34},$ and $h_{5678}$ may be completed. The receiver may store the verified hash values $h_2, h_{34},$ and $h_{5678}$ in the AHT.

The receiver that received the signature information $(m_2, h_1, h_{34}, h_{5678}, r_2)$ from the transmitter may search for a value with respect to $H(m_2)$ from the AHT and compare the received signature information to a found value. As described with reference to FIG. 8, the receiver may receive signature information with respect to each data segment, and may verify a validity of the received signature information using a scheme of searching for hash values corresponding to the data segment from the AHT.

Figure 10:
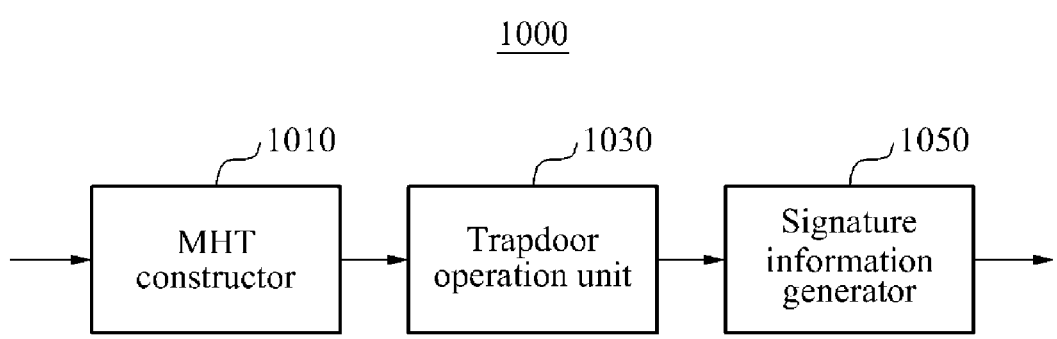
FIG. 10 is a block diagram illustrating an example of a data segment transmitter.

FIG. 10 illustrates an example of a data segment transmitter 1000.

Referring to FIG. 10, the data segment transmitter 1000 includes an MHT constructor 1010, a trapdoor operation unit 1030, and a signature information generator 1050.

The MHT constructor 1010 may construct an MHT with a predetermined number of data segments. Information to be transmitted per data segment may include at least one piece of hash information of MHT and a single trapdoor hash value. For example, in an example in which the size of the MHT corresponds to four (4), two (2) pieces of hash information and a single trapdoor hash value may be included in the MHT.

The trapdoor operation unit 1030 may associate a root hash value of the MHT constructed by the MHT constructor 1010 with a hash collision-inducing value with respect to the data segments.

The signature information generator 1050 may associate a hash value of the MHT and the hash collision-inducing value with the data segments, and may transmit the hash value of the MHT and the hash collision-inducing value to a receiver. The hash value of the MHT may include information to be used for reconstructing the MHT by the receiver. The hash value of the MHT may include at least one hash value of the MHT of a sibling node or a sub-tree not associated directly with the data segments, in the constructed MHT.

Figure 11:
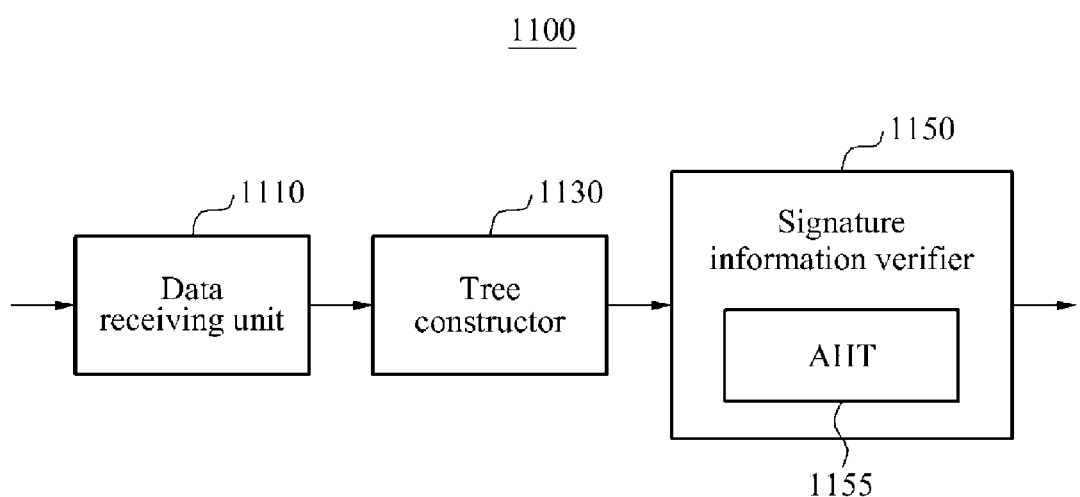
FIG. 11 is a block diagram illustrating an example of a data segment receiver.

FIG. 11 illustrates an example of a data segment receiver 1100.

Referring to FIG. 11, the data segment receiver 1100 includes a data receiving unit 1110, a tree constructor 1130, and a signature information verifier 1150.

The data receiving unit 1110 may receive signature information with respect to a predetermined number of data segments transmitted by a transmitter.

The tree constructor 1130 may construct an MHT using witness information included in the signature information received by the data receiving unit 1110.

The tree constructor 1130 may calculate a root hash value of the MHT using the witness information included in the signature information. The witness information may include a hash value of the MHT so that the data segment receiver 1100 may reconstruct the MHT using hash values of the received data segments.

The signature information verifier 1150 may verify a validity of the signature information by verifying the trapdoor hash values using the root hash value of the MHT constructed by the tree constructor 1130. The signature information verifier 1150 may include an AHT 1155 configured to store at least one of the root hash value of the MHT and the hash values of the MHT included in the signature information.

The signature information verifier 1150 may obtain at least one of the hash values of the MHT and the root hash value of the MHT from signature information of data segments received subsequently to a first data segment. The signature information verifier 1150 may search the AHT 1155 to verify whether at least one of the obtained hash value of the MHT and the obtained root hash value of the MHT is stored in the AHT 1155.

In the event at least one of the obtained hash value of the MHT and the obtained root hash value of the MHT is stored in the AHT 155, the signature information verifier 1150 may determine that the signature information of the subsequently received data segments is valid. Based on the determination that the signature information is valid, the signature information verifier 1150 may reconstruct the MHT using the hash value of the MHT included in the signature information, such as the witness information, for example.

In this example, a computational load of a transmitter and a receiver required for authenticating contents transferred in a content centric network (CCN) environment, a content delivery network (CDN) environment, and/or a peer-to-peer (P2P) network environment may be reduced, and data may be transmitted safely via channels through which a large loss of data is expected.

By improving a computational load at a transmitting end, a number of clients to be provided with a service by a single server may be increased. In addition, by reducing a computational load caused by generation of signature information, contents may be generated and distributed safely and rapidly.

The examples of methods described above may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of generating signature information, the method comprising:
   in a transmitter:
   constructing a hash tree with respect to a predetermined number of data segments;
   associating a root hash value of the hash tree with trapdoor hash values with respect to the data segments; and
   associating hash values of the hash tree and the trapdoor hash values with the data segments to generate the signature information and transmitting the hash values of the hash tree and the trapdoor hash values to a receiver,
   wherein a validity of the signature information is verified based on whether at least one of the root hash values of the hash tree and a hash value of the hash tree is stored in an authenticated hash table (AHT), and the method reduces computational load during the generation of signature information.

2. The method of claim 1, wherein the hash values of the hash tree are included in witness information, and the receiver uses the transmitted hash values of the hash tree in reconstructing the hash tree.

3. The method of claim 1, wherein the hash values of the hash tree comprise at least one hash value of the hash tree not associated directly with the data segments, in the constructed hash tree.

4. The method of claim 1, wherein:
   the number of the data segments, k, has a value corresponding to a power of 2, and a number of hash values included in the hash tree corresponds to log2 k.

5. The method of claim 1, further comprising: buffering the data segments.

6. A method of verifying signature information, the method comprising:
   receiving signature information with respect to a predetermined number of data segments from a transmitter;
   constructing a hash tree based on the signature information; and
   verifying a validity of the signature information, by verifying trapdoor hash values in the transmitter using a root hash value of the constructed hash tree,
   wherein the validity of the signature information is verified based on whether at least one of the root hash values of the hash tree and a hash value of the hash tree is stored in an authenticated hash table (AHT), and the method reduces computational load during the verification of signature information.

7. The method of claim 6, wherein the constructing of the hash tree comprises constructing a Merkle hash tree (MHT) using witness information included in the signature information.

8. The method of claim 6, wherein the verifying of the signature information comprises:

obtaining at least one of the hash value of the hash tree and the root hash value of the hash tree from signature information of subsequently received data segments;

searching the AHT to verify whether at least one of the obtained hash value of the hash tree and the obtained root hash value of the hash tree is stored in the AHT; and in response to at least one of the obtained hash value of the hash tree and the obtained root hash value of the hash tree being stored in the AHT, determining that the signature information of the subsequently received data segments is valid.

9. The method of claim 8, further comprising:

in response to neither the obtained hash value of the hash tree nor the obtained root hash value of the hash tree being stored in the AHT, storing, in the AHT, at least one of the hash value of the hash tree and the root hash value of the hash tree.

10. The method of claim 7, wherein the witness information comprises the hash value of the MHT.

11. A non-transitory computer-readable medium having stored thereon a plurality of programming instructions which, when executed by one or more computing devices, causes the one or more computing devices to perform action comprising:

receiving signature information with respect to a predetermined number of data segments from a transmitter;

constructing a hash tree based on the signature information; and verifying a validity of the signature information, by verifying trapdoor hash values in the transmitter, using a root hash value of the constructed hash tree, wherein the validity of the signature information is verified based on whether at least one of the root hash values of the hash tree and a hash value of the hash tree is stored in an authenticated hash table (AHT), and the programming instructions reduce computational load during the verification of signature information.

12. A data segment apparatus, comprising:

a transmitter comprising a processor executing instructions to, construct a hash tree with respect to a predetermined number of data segments;

associate a root hash value of the hash tree with trapdoor hash values with respect to the data segments; and associate hash values of the hash tree and the trapdoor hash values with the data segments, thereby generating the signature information, and transmitting the hash values of the hash tree and the trapdoor hash values to a receiver, wherein a validity of the signature information is verified based on whether at least one of the root hash values of the hash tree and a hash value of the hash tree are stored in an authenticated hash table (AHT), and the data segment apparatus reduces computational load during verification of the signature information.

13. The data segment apparatus of claim 12, wherein the hash values of the hash tree are used for reconstructing the hash tree by the receiver, and the hash values are included in witness information.

14. The data segment apparatus of claim 12, wherein the hash values of the hash tree comprise at least one hash value of the hash tree not associated directly with the data segments, in the constructed hash tree.

15. A data segment apparatus, comprising:

a receiver comprising a processor executing instructions to, receive signature information with respect to a predetermined number of data segments;

construct a hash tree based on the signature information; and verify a validity of the signature information by verifying trapdoor hash values using a root hash value of the constructed hash tree, wherein the validity of the signature information is verified based on whether at least one of the root hash values of the hash tree and a hash value of the hash tree are stored in an authenticated hash table (AHT), and the data segment apparatus reduces computational load during verification of the signature information.

16. The data segment apparatus of claim 15, wherein the tree constructor is configured to construct a Merkle hash tree (MHT) using witness information included in the signature information.

17. The data segment apparatus of claim 15, wherein the signature information verifier comprises:

an authenticated hash table (AHT) configured to record at least one of the root hash value of the hash tree and hash values of the hash tree included in the signature information.

18. The data segment apparatus of claim 15, wherein the signature information verifier is configured to:

obtain at least one of the hash values of the hash tree and the root hash value of the hash tree from signature information of subsequently received data segments, search the AHT to verify whether at least one of the obtained hash values of the hash tree and the obtained root hash value of the hash tree is stored in the AHT, and, in response to at least one of the obtained hash values of the hash tree and the obtained root hash value of the hash tree being stored in the AHT, determine that the signature information of the subsequently received data segments is valid.

19. The data segment apparatus of claim 16, wherein the witness information comprises a hash value of the MHT.

20. An apparatus for data authentication, comprising:

a processor executing instructions to, receive signature information with respect to a predetermined number of data segments, the signature information comprising information for constructing a hash tree associated with the data segments; and verify signature information comprising an authenticated hash table (AHT) stored in a memory, by verifying trapdoor hash values using a root hash value of the constructed hash tree, wherein a hash value or a root hash value associated with the signature information is obtained when verifying the signature information, the AHT is searched to verify whether either the obtained hash value or the obtained root hash value is stored in the AHT, and a determination is made whether the signature information of the data segments is valid in response to either the obtained hash value or the obtained root hash value being stored in the AHT, and the apparatus for data authentication reduces computational load during verification of the signature information.

21. The apparatus of claim 20, wherein the signature information verifier is configured to, in response to neither the obtained hash value nor the obtained root hash value being stored in the AHT, store the obtained hash value or the obtained root hash value in the AHT.

* * * * *